Patented Aug. 30, 1932

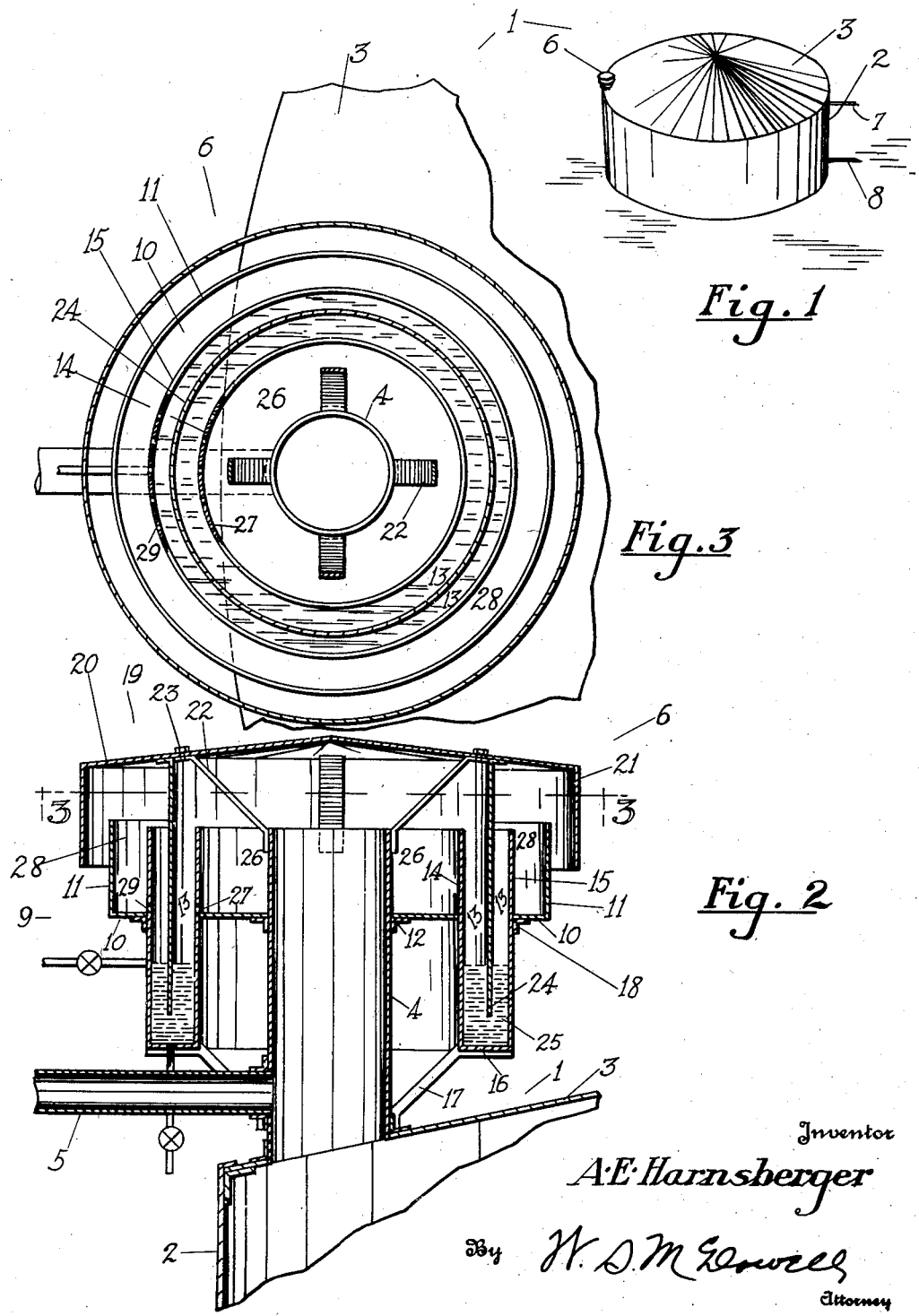

1,874,742

UNITED STATES PATENT OFFICE

AUDLEY E. HARNSBERGER, OF CHICAGO, ILLINOIS, ASSIGNOR TO THE PURE OIL COMPANY, OF CHICAGO, ILLINOIS, A CORPORATION OF OHIO

PRESSURE RELIEF MECHANISM

Application filed September 19, 1929. Serial No. 393,821.

This invention relates to an improved pressure relief mechanism adapted primarily for use in connection with fluid storage tanks, such as oil or gas containing tanks and wherein the mechanism is of such construction that provision is made for relieving automatically the interior of the tank from abnormal super or subatmospheric pressures.

Oil storage tanks of the type used by oil refineries are usually provided at their tops with pipe lines which lead to compressors and which serve for the purpose of removing gas accumulations in the upper portions of such tanks and to recover the condensable constituents of the gas as liquids. In addition to these usual gas outlet lines auxiliary pressure relief means are provided whereby in the event of mechanical failure on the part of the gas recovery system, mechanism will be provided to relieve the interior of the tank of abnormal pressures. Heretofore such auxiliary pressure relief means has usually consisted of mechanically operating valves which are open to objection in that they contain relatively movable parts, weights or springs and are subject to corrosion so that as a general rule they are not completely reliable or dependable.

It is a principal object of the present invention to provide an auxiliary pressure relief means for oil storage tanks which is formed to include a tortuous gas passage leading from the interior of the tank to the atmosphere but wherein the passage is normally closed by a displaceable liquid body, the arrangement of the liquid body within said passageway being such that the passageway will be opened when the interior of the tank is subjected to abnormal pressures by the displacement of the liquid from its normal position within the passageway to the end for permitting of gas flow from the interior of the tank through said passageway to the atmosphere or vice versa.

It will be understood that oil storage tanks are usually formed from sheet metal plate and structural iron members and most tanks of this character possess many square feet of area. Their construction, however, is such as to permit the tanks to withstand all ordinary pressures. However, it will be appreciated that if the interior of the tank, due to withdrawal of liquid or other causes, were to develop sub-atmospheric pressures of, for example, 12 ounces, tremendous abnormal pressures would be imparted to the walls of the tank from the exterior which would be apt to cause the collapse or destruction of the tank. This would also be true if the interior of the tank were to develop unrelieved super-atmospheric pressures of the same character. Hence it is vitally important in the operation of such tanks to provide a completely dependable relief mechanism for preventing destruction of the tanks from the influences specified. In this respect the relief mechanism provided in the present invention is devoid of relatively movable parts, such as springs or valves and relies upon a liquid seal, such as a low freezing point oil, and the displacement of the liquid in the matter of regulating the internal pressures within the tank.

It is another important object of the invention to provide a liquid seal type of auxiliary relief means wherein provision is made upon the displacement of the liquid to catch or retain the same within the confines of the relief mechanism itself and to permit of the return of the liquid automatically to its normal sealing position when the abnormal pressures have been relieved.

With these and other objects in view which will appear as the description proceeds, my invention consists in the novel features of construction, combinations of elements and arrangements of parts hereinafter to be fully described and pointed out in the appended claims.

In the accompanying drawing:

Figure 1 is a perspective view of an oil storage tank provided with the auxiliary pressure relief mechanism comprising the present invention, Figure 2 is a vertical sectional view taken through said relief mechanism, showing the latter on an enlarged scale, and Figure 3 is a horizontal sectional view taken on the plane indicated by the line 3—3 of Figure 2.

Referring more particularly to the drawing, the numeral 1 designates the ordinary cylindrical oil retaining tank of the type commonly employed in oil refineries for the storage of hydrocarbon fluids. The tank includes the customary cylindrical side walls 2 and has substantially a conical top 3. Arranged in the top is a vertical pipe or riser 4 with which is connected a gas recovery line 5. This line leads ordinarily to a compressor (not shown) which operates to remove the condensable constituents contained in the gas taken from the top of the tank. The upper portion of the riser or pipe 4 communicates with the auxiliary pressure relief mechanism 6 comprising the present invention.

As previously stated, when oil is stored in the tank 1 the latter is subjected at times to abnormal pressures. For example, oil may enter the interior of the tank 1 by way of the inlet line 7 shown in Figure 1, and may be removed from the tank by way of the valved exhaust line 8. It will be understood that as oil enters the tank by way of the line 7 and as the tank gradually fills with the liquid the gas pressure in the upper portion of the tank must be relieved. Ordinarily this is accomplished by the passage of the gas through the recovery line 5 to the compressor. Likewise, as oil is withdrawn from the interior of the tank by the exhaust line 8 relief must be provided in the upper portion of the tank to overcome the tendency on the part of the descending liquid body to produce sub-atmospheric pressures in the top of the tank and this may also be accomplished by the introduction of gas into the top of the tank through the recovery line 5. However, it happens from time to time that due to mechanical failure or other causes the gas recovery system, which includes the line 5, may fail with the result that the latter does not function as it is supposed to in the matter of regulating the internal pressures within the tank, and, therefore, in order to provide for this contingency use is made of the pressure relief mechanism 6. It will be understood that I do not claim as my invention broadly the employment of a pressure relief mechanism in connection with an oil storage tank, since the present invention is directed to the novel structural features of the mechanism shown at 6, which I consider to be more reliable and effective than the devices hitherto employed for performing the auxiliary functions thereof.

Surrounding the upper portion of the riser 4 is a circular pan 9, which comprises a bottom 10 and a circular upstanding outer wall 11, the pan being firmly fixed to the outer wall of the riser in a stationary position by the employment of the circular flange 12 or other equivalent means. The upper edge of the wall 11 of the pan terminates in the same horizontal plane as the upper edge of the riser. Arranged concentrically within the pan and surrounding but spaced from the riser 4 is a circular trough 13 which includes a pair of spaced circular vertical inner and outer walls 14 and 15 and a bottom wall 16. This trough is supported by braces 17 extending from the riser 4 to the bottom wall 16, and the outer walls 15 of the trough are connected with the bottom 10 of the pan 9 by flanges 18.

Arranged to cover and protect this structure is a cover member 19, which comprises a conical top wall 20 and an outer circular depending wall 21, the lower edge of which extends below the upper edge of the wall 11 and is spaced laterally from the pan. The cover member may be carried by fixed arms 22 extending upwardly and outwardly from the top of the riser 4, securing elements 23 being utilized to connect the outer ends of the arms 22 with the top wall 20 of the cover member so as to secured hold the latter against displacement.

Depending from the cover member is a circular partition wall 24, which is received between the walls 14 and 15 of the trough, but terminates immediately above the bottom wall 16 of said trough, and arranged to be received within the bottom of the trough and to engage with the lower portions of the wall 24 is a body of sealing liquid 25 which may partake of the form of a low freezing point oil. It will be observed that a circular chamber 26 is formed between the inner wall 14 of the trough, the bottom of the pan 9 and the riser 4, and perforations 27 are provided in the wall 14 for the purpose of establishing communication between the chamber 26 and the interior of the trough 13 on the inner side of the wall 24. Similarly, an outer circular chamber 28 is provided between the wall 11 of the pan, the bottom 10 thereof and the outer wall 15 of the trough. This outer chamber 28 communicates with the trough 13 by the employment of small perforations or apertures 29 which are formed in the wall 15 and contiguous to the bottom 10 of the pan.

Having now described the construction of the pressure relief mechanism, I will endeavor to point out its operation and advantages. Assuming that for any reason the gas recovery line 5 should be obstructed and super-atmospheric pressures should then develop in the tank 1, it will be seen that such pressures will be applied to the liquid body 25 and if the pressures should develop to an abnormal point requiring relief the liquid in the bottom of the trough will be displaced and will be forced upwardly, as the pressures increase, over the outer wall of the trough and into the outer compartment or chamber 28. This permits the gas to escape to the atmosphere by passing between the cover member and the outer wall of the pan 9. Particular attention is directed to the chamber 28 which has a capacity sufficiently large to hold the entire oil body normally contained in the trough. The presence of the chamber 28 prevents the loss of the liquid when enforced expulsion of the latter takes place from its normal sealing position. The apertures 29 in the bottom of the chamber 28 permit the liquid to then return to its normal position following relief of the abnormal pressures. The converse of this operation takes place when abnormal sub-atmospheric pressures obtain in the tank. When such pressures are present the liquid sealing body is again displaced by the unbalanced external and internal pressures on the liquid. Thus the atmospheric pressure will cause the liquid body to overflow the wall 14 of the trough where said liquid body or substantial part thereof is collected in the inner chamber 26, thus permitting the tortuous passageway provided by the walls 14 and 15 and the partition wall 24 to open and allow atmospheric air to enter the tank to relieve the partial vacuum present therein. As in the case of the chamber 28 when the abnormal pressures have been relieved the liquid in the chamber 26 returns automatically to the bottom of the trough by the provision of the perforations 27.

In view of the foregoing it will be seen that the present invention provides an auxiliary automatic relief mechanism for controlling internal pressures in an oil storage tank and for insuring safety in the operation of the tank. The functioning of the relief mechanism is automatic and the construction thereof eliminates entirely the use of springs, valves and similar movable parts heretofore largely used in mechanisms of this character. The relief mechanism has the advantage of being positively and completely reliable in its operation.

While I have shown and described the preferred embodiment of my invention, it will be understood that changes may be made in the details of construction without departing from the spirit of the invention and the scope of the appended claims.

What is claimed is:

1. An emergency pressure relief mechanism for fluid storage tanks comprising an outlet in the form of a vertical riser extending upwardly from the roof of a fluid storage tank and in open communication at its lower end with the interior of the tank, a stationary circular casing surrounding said riser and provided with a relatively deep annular reservoir having an open top, said reservoir being spaced from said riser and provided with a liquid sealing medium in the closed bottom portion thereof, a cap member stationarily supported above and protecting the open tops of said riser and reservoir, a circular divisional wall suspended from said cap member and positioned substantially centrally in said reservoir and the liquid sealing medium contained therein, whereby the quantity of said medium disposed on opposite sides of the wall will be substantially equalized when the pressures both internal and external of the tank are approximately the same, and circular over-flow basins arranged on both sides of the reservoir around the upper portion thereof for the reception of liquid displaced from said reservoir by unequalized pressure conditions, said basins being provided with drains for leading liquid back to the reservoir, the said drains being disposed above the normal liquid level of the reservoir.

2. An emergency pressure relief mechanism for fluid storage tanks, comprising an outlet in the form of a vertical riser extending upwardly from the roof of a fluid storage tank and in open communication at its lower end with the interior and upper region of the tank, a stationary circular casing surrounding said riser and provided with a relatively deep annular reservoir adapted to hold a liquid sealing medium in the closed bottom portion thereof, a cap member stationarily supported above and protecting the open top of said riser and reservoir, a circular divisional wall positioned substantially centrally in said reservoir and the liquid sealing medium contained therein, whereby the quantity of said medium disposed on opposite sides of the wall will be substantially equalized when approximately equivalent pressures exist both internally and externally of the tank, and circular over-flow basins arranged on both sides of the reservoir around the upper portion thereof for the reception of liquid displaced from said reservoir by unequalized pressure, said basins being provided contiguous to their lower portions with drains for conducting the liquid sealing medium trapped thereby to the reservoir, the said drains being disposed in a horizontal plane above the normal liquid level of the reservoir.

3. An emergency pressure relief mechanism for fluid storage tanks comprising an outlet in the form of a vertical open ended pipe arising from the roof region of a fluid storage tank, a stationary circular casing surrounding said pipe in contacting relation with respect thereto, said casing being provided with a relatively deep annular reservoir adapted for the reception of a liquid sealing medium, a cap member stationarily supported above and protecting the open top of said pipe and reservoir, said cap member being provided along its outer peripheral edge with a depending skirt, a circular divisional wall suspended from said cap member and positioned substantially centrally in the annular reservoir, whereby the quantity of the liquid sealing medium disposed on opposite sides of the wall will be substantially equalized when the pressures both internal and external of the tank are substantially in equilibrium, a catch basin formed between the upper portion of said pipe and the inner wall of said reservoir, and a second catch basin concentrally surrounding the outer wall of said reservoir and spaced from the depending skirt of said cap member.

4. An emergency pressure relief mechanism for fluid storage tanks comprising an outlet in the form of a vertical open ended pipe arising from the roof region of a fluid storage tank, a stationary circular casing surrounding said pipe in contacting relation with respect thereto, said casing being provided with a relatively deep annular reservoir adapted for the reception of a liquid sealing medium, a cap member stationarily supported above and protecting the open top of said pipe and reservoir, said cap member being provided along its outer peripheral edge with a depending skirt, a circular divisional wall suspended from said cap member and positioned substantially centrally in the annular reservoir, whereby the quantity of the liquid sealing medium disposed on opposite sides of the wall will be substantially equalized when the pressures both internal and external of the tank are substantially in equilibrium, a catch basin formed between the upper portion of said pipe and the inner wall of said reservoir, a second catch basin concentrally surrounding the outer wall of said reservoir and spaced from the depending skirt of said cap member, and valved pipe outlets for regulating the level of the liquid sealing medium in the bottom of said reservoir.

In testimony whereof I affix my signature.

AUDLEY E. HARNSBERGER.